Patented July 5, 1938

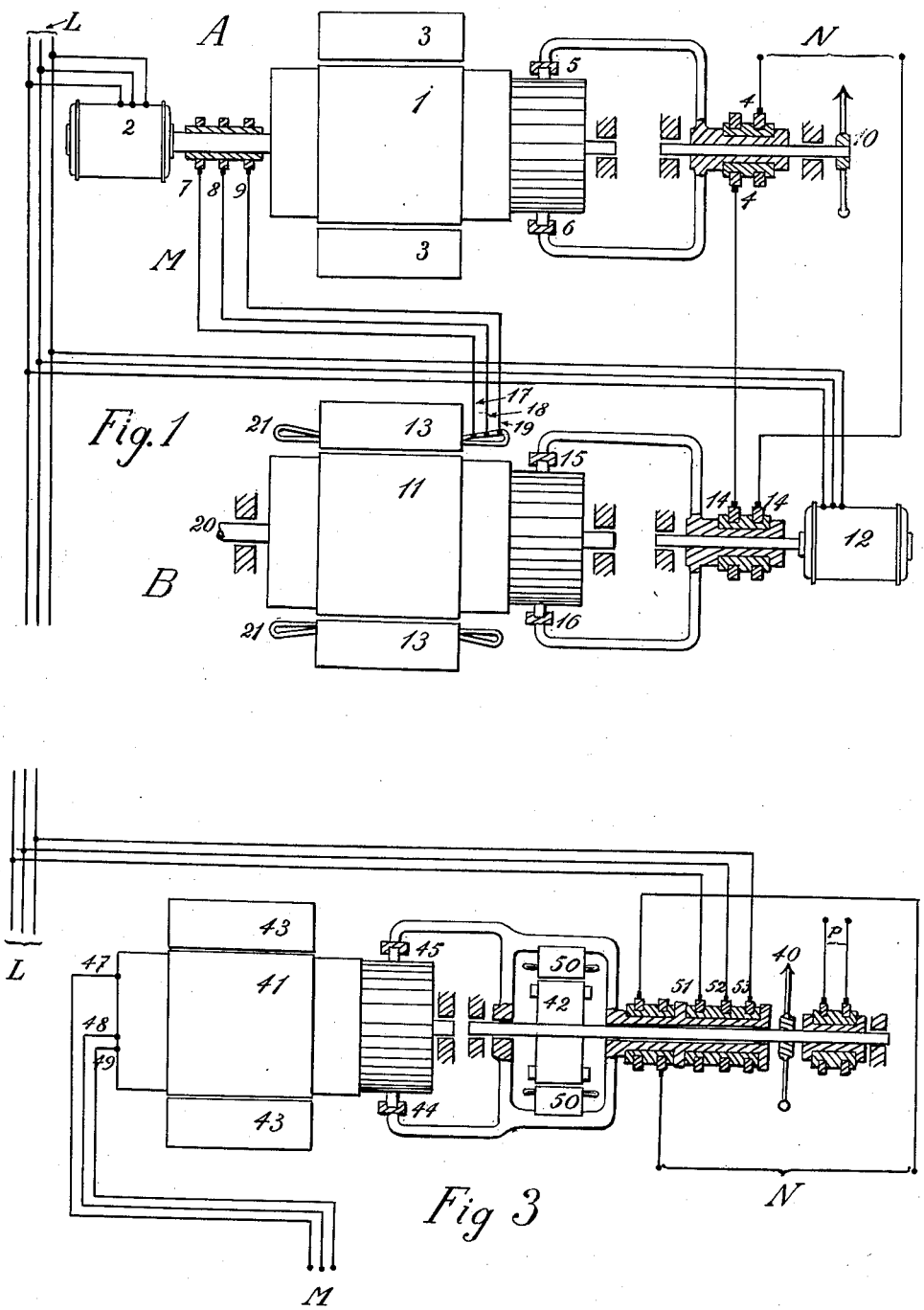

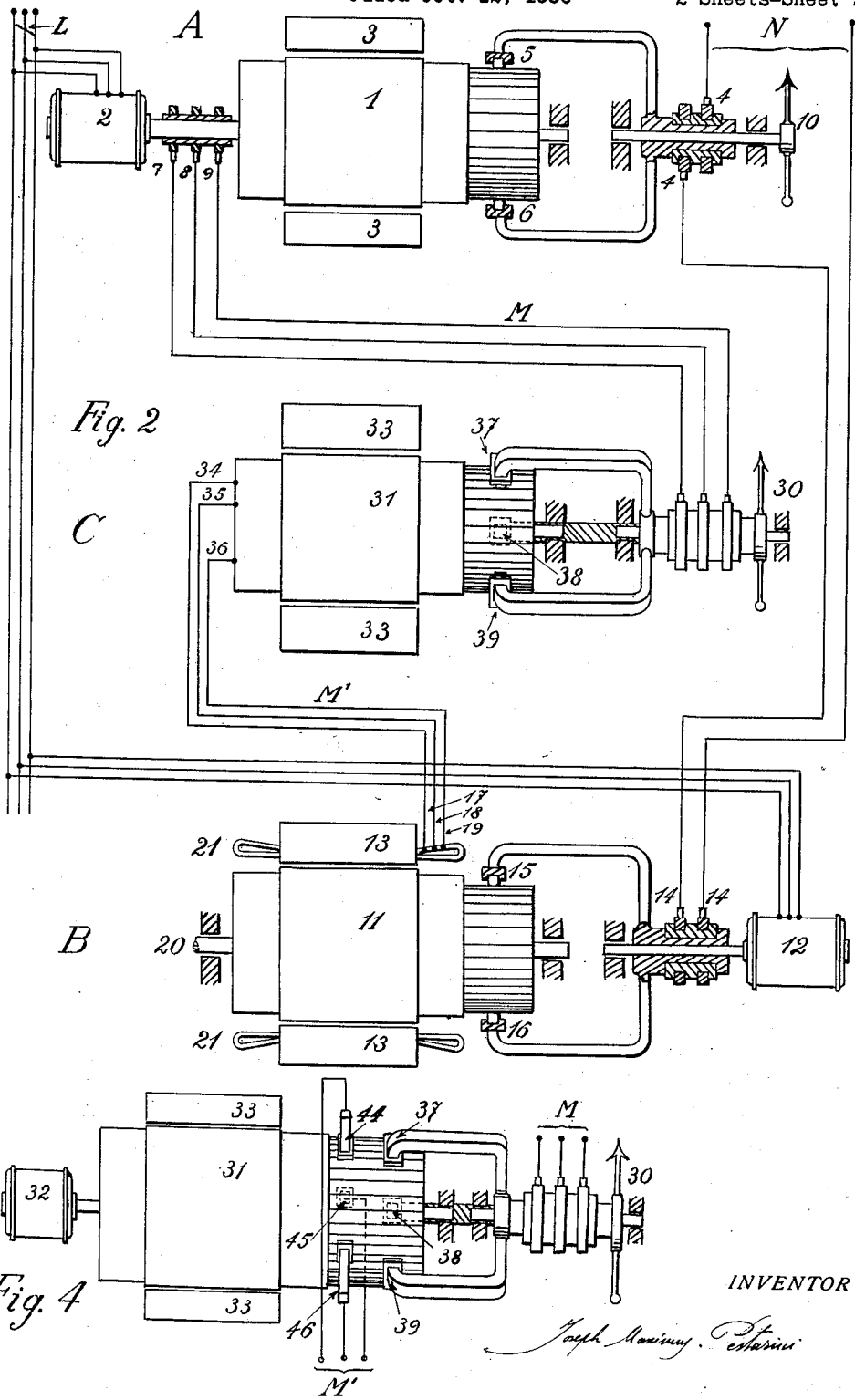

2,122,917

UNITED STATES PATENT OFFICE 2,122,917

AMPLIFIER OF SPACE DISPLACEMENTS

Joseph Maximus Pestarini, Grant City, Staten Island, N. Y.

Application October 12, 1936, Serial No. 105,198

3 Claims. (Cl. 172—239)

This invention relates to an electrical apparatus used for receiving an arbitrary movement to a receiving station with a high accuracy for the similitude of movement and with a force or with a torque by far stronger than the one used at the transmitting station.

The apparatus, object matter of this invention, has three parts:—

A transmitting part, a transmitting line, and a receiving part.

Considering a very simple case of application of the invention, object matter of the present specification, the transmitting part consists of a machine having essentially an armature winding provided with a commutator and a magnetic core without windings affording magnetic path to the flux created by the armature ampere-turns; the commutator bears one set of brushes, called the exciting set, having two diametrical opposite brushes fed by a direct constant current and variable voltage supply.

A number of symmetrically distributed taps along the winding as to form a polyphase system are connected to the transmitting line by means of sliprings and associated brushes.

The angular displacement given to the above mentioned brushes set is the arbitrarily given angular displacement intended to be transmitted.

Provision is made as to keep a permanent relative rotation between the armature winding and the exciting set of brushes. Thus the direct constant current traversing the brushes of the exciting set creates a flux which induces polyphase electromotive forces between the polyphase taps, the phase and frequency of which depends on the angular displacement and the angular speed of the exciting set of brushes.

Assuming that the angular speed of the displacement to be transmitted be zero, the above-mentioned relative permanent rotation is preferably a rotation at constant angular speed, such as to induce between the polyphase system of taps an electromotive force of pulsation $w$, here called the "fundamental" pulsation. If the angular speed of the displacement to be transmitted is not zero, then the pulsation of the induced electromotive force between the taps will have a value $w+v$ where $v$ is the additional value positive or negative due to the speed of the displacement to be transmitted, here called the "dictated" pulsation; for the sake of brevity the sum $w+v$ of the fundamental pulsation and the "dictated" pulsation will here be called the "modulated" pulsation.

The transmitting line consists of three groups of wires, a first group of two wires carrying the direct constant current for the exciting set of brushes; a second group of polyphase wires carrying the polyphase current supplied by the polyphase system of taps, and a third group of wires carrying a system of polyphase current supplied by an auxiliary source preferably of alternating current at constant frequency and constant voltage, and used for keeping the relative permanent rotation corresponding to the "fundamental" pulsation $w$.

The receiving part consists essentially of a rotating machine having an armature provided with an armature winding connected to a commutator, and a stator provided with a polyphase winding. The commutator bears a set of brushes, called the exciting set, and it has two diametrically opposite brushes traversed by direct constant current; this set of brushes is kept revolving at the rotational speed as the one corresponding to the fundamental pulsation $w$; the polyphase taps of the polyphase stator winding are connected to the corresponding brushes of the polyphase tap system of the transmitting machine. If the "dictated" pulsation, $v$, is zero, the shaft of the receiving machine will remain at standstill and it will not move beyond a small angle in one or in the other direction unless a great torque is developed; if the dictated pulsation $v$ is not zero, then the shaft of the receiving machine will rotate with a speed corresponding exactly to the "dictated" pulsation $v$, developing a great torque even for a small angular lagging; if the "dictated" pulsation is given various values, function of the time, say $v(t)$ beginning the instant $t_1$ and ending the instant $t_2$, the shaft of the receiving machine will describe an angle corresponding to the following value $$\int_{t_2}^{t_1} v(t)dt$$

and it will develop a great torque until the angle is exactly described, repeating thus accurately the angular displacement dictated to the transmitting machine.

Hereunder are described examples embodying the invention, object matter of this application, and they are partly illustrated by schematic figures. Fig. 1 shows the complete arrangement of a simple case with a schematic longitudinal section of the transmitting and the receiving machines; Fig. 2 shows the complete arrangement with a schematic longitudinal section of the transmitting machines and of the receiving machine, the arrangement embodying two transmitting machines; Fig. 3 shows a schematic longitudinal section of an alternative of the transmitting machine, and Fig. 4 shows a schematic longitudinal section of another alternative of a transmitting machine.

Assuming that the displacement to be transmitted is an angular movement, Fig. 1 shows schematically an arrangement embodying the invention, object matter of this application, where the angular movement dictated by a very small torque, will be transmitted with a great accuracy regarding the value of the angular displacement, while the receiving machine will develop a large torque, until the angular displacement is exactly and completely transmitted.

At the top of the figure is represented the transmitting machine A in partial schematic longitudinal section; at the bottom is the receiving machine B, the transmitting line consists of three elementary lines: a three phase line L, supposed to be fed with alternating current at constant pulsation, the fundamental pulsation $w$, and at constant voltage supplied by an auxiliary generator of alternating current; the three phase line M, transmitting the alternating current of the modulated pulsation, $w+v$, sum of the fundamental and the dictated pulsation, and, finally the direct constant current line N fed by an auxiliary generator of direct constant current at variable voltage. Both auxiliary sources are not shown on the figure for the sake of simplicity and they may be of any kind of the well-known type.

The transmitting machine consists essentially of the armature 1 having an armature winding associated with a commutator, and provided with symmetrically distributed taps as to form a polyphase system, connected to sliprings associated with brushes 7, 8, 9. The armature is encircled by a laminated iron ring 3 without winding, merely affording a magnetic path to the flux created by the currents traversing the armature. A synchronous motor, schematically shown by 2, fed by the line L, drives the armature 1 at a speed corresponding to the fundamental pulsation $w$. The commutator associated with the armature bears a set of two brushes 5 and 6, kept diametrically opposite by brushholders which may rotate around a shaft, the displacement being obtained by means of the dial 10 which dictates the angular displacement to be transmitted. It may be immediately noticed that the torque required for dictating the angular displacement is very small, because it has to overcome merely the brush frictions. The brushes 5 and 6 are fed with direct constant current supplied from the line N, by means of two sliprings associated with brushes 4, 4.

The receiving machine consists essentially of the armature 11 having an armature winding associated with a commutator, and encircled by a laminated stator 13 with polyphase windings 21. The commutator bears one set of brushes, the exciting set, of two diametrically opposite brushes 15 and 16, the brushholders being kept in continuous rotation by the synchronous motor 12 fed by the alternating current supplied by line L, and rotating with a speed corresponding to the fundamental frequency $w$; the brushes 15 and 16 are fed with direct constant current supplied from the line N by means of two sliprings associated with brushes 14. The polyphase stator winding 21 has three taps 17, 18, and 19 connected to the corresponding brushes 7, 8 and 9 of the transmitting machine.

Assume that the dial 10 is kept at standstill at the position O. The direct constant current supplied by the line N, will traverse the armature winding of the armature 1 and will create a flux fixed in the space. Between the brushes 7, 8, and 9 electromotive forces will be induced of the following values:—

$$e_1 = kw \sin wt$$
$$e_2 = kw \sin \left(wt + \frac{2\eta}{3}\right) \quad\quad (1)$$
$$e_3 = kw \sin \left(wt + \frac{4\eta}{3}\right)$$

where $k$ is a constant.

On the other hand, for similar reasons, we shall have in the magnetic circuit of the receiving machine a rotating flux created by the armature ampere turns due to direct constant current traversing the revolving exciting set of brushes 15 and 16; this flux induces between the terminals 17, 18 and 19 alternating electromotive forces of pulsation $w$. If then the said electromotive forces are exactly in phase with the above written (1), no current will flow between the brushes 7, 8 and 9 and the corresponding taps 17, 18 and 19; the shaft 20 of the receiving apparatus has then a definite position which may be called the O position.

Assuming now the dial 10 is given an angular displacement $a$, the induced electromotive forces between the brushes 7, 8 and 9, shall have the following values:—

$$e_1 = kw \sin (wt + a)$$
$$e_2 = kw \sin \left(wt + a + \frac{2\eta}{3}\right) \quad\quad (2)$$
$$e_3 = kw \sin \left(wt + a + \frac{4\eta}{3}\right)$$

and large currents will traverse the line system M and these currents traversing the armature winding of the receiving apparatus, will develop a large torque that will give the shaft exactly the angular displacement $a$; and if some resistant torque tends to bring the shaft out from the position corresponding to the angular displacement $a$, say by the angle $\Delta a$, the armature current will develope a strong torque proportional to $\Delta a$ and tending to annihilate the discrepancy of the angular displacement from its exact value; this happens exactly in the same way as in the synchronous motors, when they afford a resistance trying to bring them out of step with the frequency of the line.

Assuming the shaft 20 had to afford during the complete displacement a resistant torque, it will develop work, and the corresponding electric energy will be supplied exclusively by the source of direct constant current feeding the line system N. In fact the electric energy must be supplied either by the line system L or by the line system N, or by both; yet the torque developed by the transmitting machine is zero because no torque can be developed on the stator being a symmetrical magnetic ring without winding, thus the synchronous motor 2 has simply to overcome the friction losses and other losses but nothing of the main transmitted energy; on the other hand the synchronous motor 12 has obviously nothing to supply but the friction losses of the exciting brush set, thus finally the line system L has to supply energy only for a part of the losses but nothing of the transmitted energy needed for operating the angular displacement $a$ under the resistant torque; thus the whole electric energy corresponding to the work made by the resistant torque along the angular displacement $a$ is supplied by the network N fed with direct constant current.

The iron ring 3 encircling the armature of the transmitting apparatus may either be movable in respect of the armature or it may be fixed to it with an air gap preferably; any of these two alternatives may be adopted.

The transmitting machine A has been supposed on Fig. 1 to have an armature with only one winding traversed simultaneously by the direct constant current and the alternating current of the modulated pulsation $w+v$; instead of this arrangement one may adopt as well two separate armature windings, one winding associated with the commutator being traversed by the direct constant current, and the other winding without commutator being traversed by the alternating current system of the modulated pulsation $w+v$, provided the two windings are fixed the one in respect to the other.

On Fig. 1 the receiving machine B is shown with its stator traversed by the alternating current system of the modulated pulsation $w+v$, and the rotor traversed by the direct constant current; instead of this arrangement one may adopt a stator winding associated with a commutator for the direct constant current and a rotor winding associated with sliprings for the alternating current of the modulated pulsation $w+v$.

So far the transmission of a single angular displacement has been considered; in some applications it is required to transmit the sum of two or more angular displacements. Fig. 2 shows the complete scheme of an arrangement embodying the invention, object matter of this application, and where the algebraic sum of two independent angular displacements is transmitted the torque exerted on the dictating dials 10 and 30 being exceedingly small and yet the torque developed by the shaft 20 of the receiving machine B being relatively very large.

The transmitting part has now two independent transmitting machines, the machines A at the top of the figure identical to the transmitting machine A indicated in Fig. 1, and having its various elements indicated by the same reference numbers as in Fig. 1, and a second transmitting machine C shown in the middle of Fig. 2.

At the bottom of the Fig. 2 is schematically shown the receiving machine B the same as in Fig. 1. The second transmitting machine C consists essentially of an armature 31 with a winding associated to a commutator, the armature being encircled by a laminated magnetic ring 33 affording merely a path for the flux created by the armature ampere turns. On the winding a number of equal distant taps 34, 35 and 36, have been arranged so as to form a polyphase system. The commutator bears a set of three brushes 37, 38 and 39 forming a polyphase symmetric system connected to the line system M by means of sliprings and brushes, the brushholders of the brushes 37, 38 and 39 form a body movable upon a shaft by means of the dial 30. Let us assume that for the O position of the dial 30, the taps 34, 35 and 36 correspond exactly to the location of the brushes 37, 38 and 39, then it is obvious that we shall obtain at the taps 34, 35 and 36 exactly the same electromotive forces as obtained between the taps 7, 8 and 9, and, therefore, only the angular displacement, say $a$ of the dial 10, is transmitted to the receiving machine; but if the dial 30 of the second transmitting machine, C, is given an angular displacement, say $b$, the receiving machine B will be displaced by the angle $a+b$ thus operating the sum of the angular displacement dictated by the dials 10 and 30.

Instead of the sum of two independent angular displacements one may consider the sum of any number, say $n$, of independent angular displacements using $n-1$ intermediate machines like the machine C, connected in cascade to one another.

In order to increase the accuracy, we may rotate continuously the armature of the machine C as Fig. 4 shows by means of an auxiliary motor 32; in this case we must replace the taps 34, 35 and 36 by a set of brushes 44, 45 and 46 which collect the currents of frequency $w+v_1+v_2$, where $w$ is the "fundamental" frequency, $v_1$ is the frequency dictated by the dial 10 and $v_2$ is the frequency dictated by the dial 30.

In the arrangement shown by Fig. 1 the armature 1 of the transmitting machine is driven by the synchronous motor 2. What matters is the relative movement between the exciting set of brushes traversed by the direct constant current and the armature winding, and not the way this relative movement is obtained. Fig. 3 shows an alternative arrangement where the said relative movement is obtained by another way which leaves the armature fixed in space and which, therefore, allows the heaviest part of the transmitting apparatus to remain at standstill. The relative movement between the exciting set of brushes and the armature winding is obtained by the interposition of a synchronous motor between the dial and the brush set. The synchronous motor has its two members, inductor and armature, both able to revolve; on Fig. 3 it is supposed that the inductor 42 is mechanically rigid with the dial 40 but that it may revolve together with the dial around an axis. The direct current for the excitation of the inductors is collected by two sliprings and supplied by line P. Around the inductor 42, the armature 50 revolves with the speed corresponding to the fundamental pulsation $w$ and it is fed by the line L by means of the sliprings 51, 52, and 53. Both windings, the armature winding and the field exciting winding, of the synchronous motor, have been shown on the figure. The exciting set of brushes 44 and 45 is fed by the direct constant current supply N by means also of sliprings.

If the dial is at standstill the exciting set of brushes 44 and 45 will rotate at a speed corresponding to the fundamental pulsation $w$, and the pulsation of the electromotive forces induced between the polyphase taps 47, 48 and 49 will be simply the fundamental pulsation; if on the contrary the dial 40 is moved with a speed corresponding to the dictated pulsation $v$, the electromotive forces induced between the taps 47, 48 and 49 will have the modulated pulsation $w+v$, and thus the angular displacement of the dial 40 will be accurately transmitted, with an amplified torque, by the receiving machine.

In all arrangements hereabove described the fundamental pulsation $w$ is preferably constant but it may also vary to some extent without impairing the accuracy of the transmission. In any case, it must be chosen of a higher value than the maximum value of the dictated pulsation $v$ so as to have always a modulated pulsation $w+v$ still high enough as to give rise to a large correcting torque on the shaft 20 of the receiving machine, tending to keep the receiving machine tight in step with the transmitting machine for any possible value of the dictated pulsation $v$.

The examples given hereabove are not limitative, as the invention, object matter of the present application, may be carried out by a man of the art in many other ways, without any inventive effort, by simply following the directions disclosed in the present specifications.

Having now particularly described and ascertained the nature of my invention, and in what manner the same is to be performed, I declare that what I claim is:—

1. In a plant for the transmission of an angular displacement resulting from $n$ components and for the amplification of the transmitting torque, a primary transmitting machine creating a polyphase system of currents having a frequency equal to the sum of a "fundamental" frequency $w$ and a "dictated" frequency $v_1$ proportional to the speed of a first component displacement, essentially consisting of a wound armature, an iron ring encircling said armature, collecting means for delivering the polyphase currents on one side of said machine and a commutator on the other side, and a set of brushes cooperating with said commutator and traversed by a direct constant current, means for imparting a relative rotation to the set of brushes and armature with a speed proportional to $w+v_1$, a set of $n-1$ secondary transmitting machines, each receiving the polyphase currents of the frequency $$w+v_1+v_2+ \ldots v_h$$

and transforming them into polyphase currents of the frequency $w+v_1+v_2+ \ldots v_h+v_k$ and essentially consisting of a wound armature, an iron magnetic ring encircling said armature, a commutator, a set of brushes and a set of collecting means whereby said secondary transmitting machine receives the first system of currents through said set of brushes and delivers the second system of currents through said set of collecting means, means for imparting a relative rotation to the two sets with a speed proportional to the added "dictated" frequency $v_k$; a receiving machine essentially consisting of a wound stator member and a wound rotor member, one of said members being fed by the polyphase system of currents of the frequency $$w+v_1+ \ldots +v_n,$$

a commutator and a set of two brushes associated with the other member and traversed by a direct constant current and means for imparting a relative rotation to said brushes with an angular speed proportional to the fundamental frequency $w$.

2. In a plant for the transmission of an angular displacement resulting from $n$ components and for the amplification of the transmitting torque, a primary transmitting machine creating a polyphase system of currents having a frequency equal to the sum of a "fundamental" frequency $w$ and a "dictated" frequency $v_1$ proportional to the speed of a first component displacement, essentially consisting of a wound armature encircled by an iron ring, taps and sliprings on one side of said machine for delivering the polyphase currents and a commutator and a set of brushes traversed by a direct constant current on the other side, means for imparting a rotation to the armature with a speed proportional to the "fundamental" frequency $w$, and another rotation to the set of brushes with a speed proportional to the "dictated" frequency $v_1$, a set of $n-1$ secondary transmitting machines, each receiving the polyphase currents of the frequency $$w+v_1+v_2+ \ldots v_h$$

and transforming them into polyphase currents of the frequency $w+v_1+v_2+ \ldots v_h+v_k$ and essentially consisting of a wound armature, an iron magnetic ring encircling said armature, collecting means comprising a set of brushes for feeding the first system of currents to said armature, taps for delivering the second system of currents and means for imparting a rotation to the set of brushes with a speed proportional to the frequency $v_k$; a receiving machine essentially consisting of a wound stator member and a wound rotor member, one of said members being fed by the polyphase system of currents of the frequency $w+v_1+v_2+ \ldots +v_n$, a commutator and a set of two brushes associated with the other member and traversed by a direct constant current and means for imparting a rotation to said brushes with an angular speed proportional to the fundamental frequency $w$.

3. In a plant for the transmission of an angular displacement resulting from $n$ components and for the amplification of the transmitting torque, a primary transmitting machine creating a polyphase system of currents having a frequency equal to the sum of a "fundamental" frequency $w$ and a "dictated" frequency $v_1$ proportional to the speed of a first component displacement, essentially consisting of a fixed wound armature, an iron ring encircling said armature, taps on one side of said armature for delivering the polyphase currents and a commutator and a set of brushes on the other side of said armature traversed by a direct constant current, means for imparting a rotation to the said set of brushes with respect to the commutator at a speed proportional to the fundamental frequency $w$ and means for imparting a further rotation to said commutator at a speed proportional to the dictated frequency $v_1$; a set of $n-1$ secondary transmitting machines, each receiving the polyphase currents of the frequency $$w+v_1+v_2+ \ldots v_h$$

and transforming them into polyphase currents of the frequency $w+v_1+v_2+ \ldots v_h+v_k$ and essentially consisting of a wound armature, an iron magnetic ring encircling said armature, a commutator associated with said armature, a first fixed set of brushes for feeding to said commutator the first system of currents, a second set of brushes cooperating with said commutator and delivering the second system of currents, means for imparting to the armature a speed proportional to the fundamental frequency $w$ and to the second set of brushes a rotation with a speed proportional to the "added" "dictated" frequency $v_k$, a receiving machine essentially consisting of a wound stator member and a wound rotor member, one of said members being fed by the polyphase system of currents of the frequency $$w+v_1+v_2+ \ldots v_n,$$

a commutator, a set of two brushes associated with said commutator and traversed by a direct constant current and means for imparting to said brushes a rotation with respect to the commutator with an angular speed proportional to the fundamental frequency $w$.

JOSEPH MAXIMUS PESTARINI.